W. W. BUNYAN.
DIFFERENTIAL POWER TRANSMISSION MECHANISM.
APPLICATION FILED JAN. 15, 1917.
1,250,700.
Patented Dec. 18, 1917.
2 SHEETS—SHEET 1.
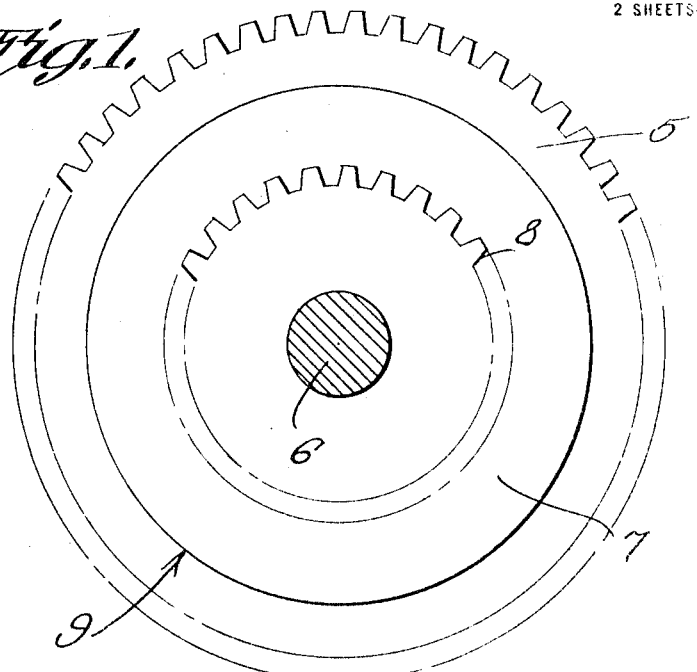
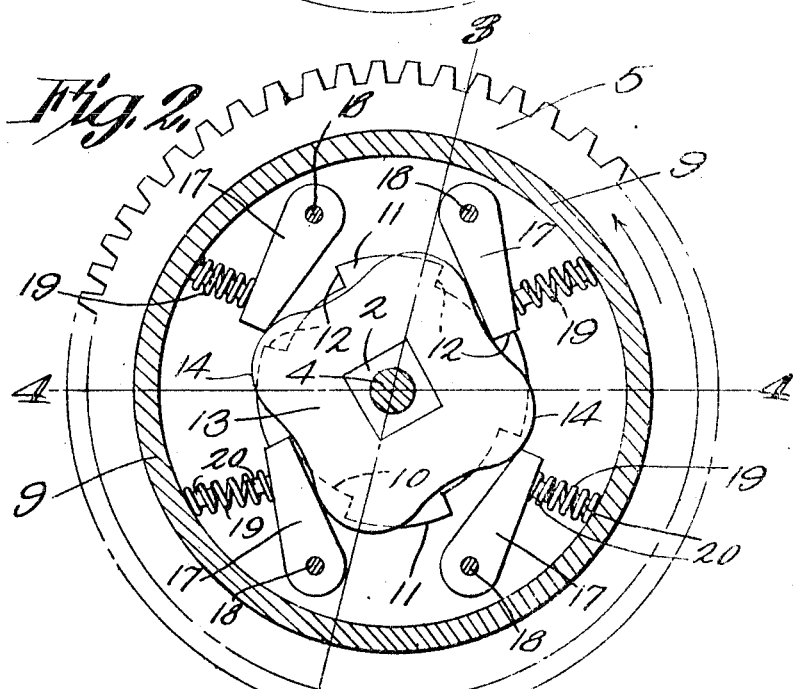
Witnesses
Walter W. Bunyan, Inventor
by
Attorneys

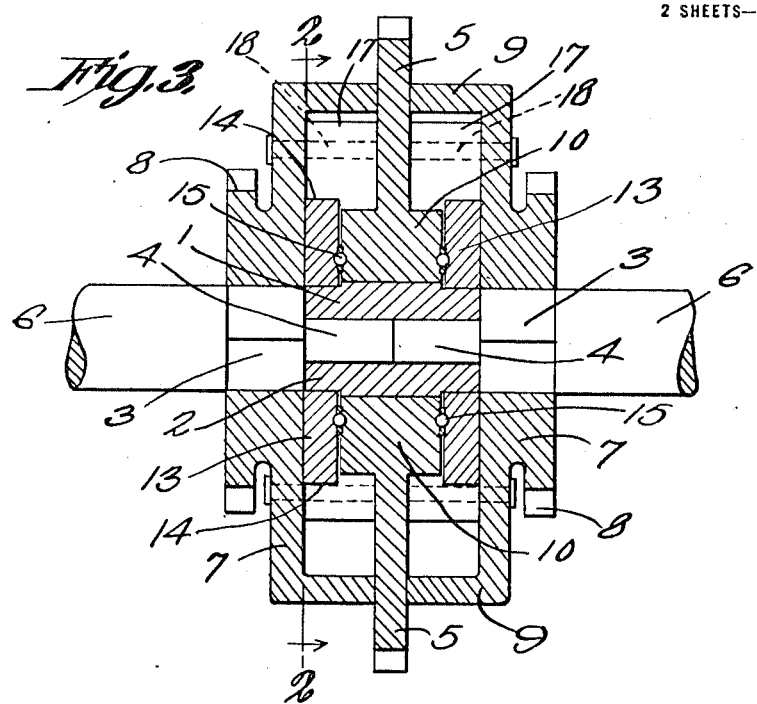
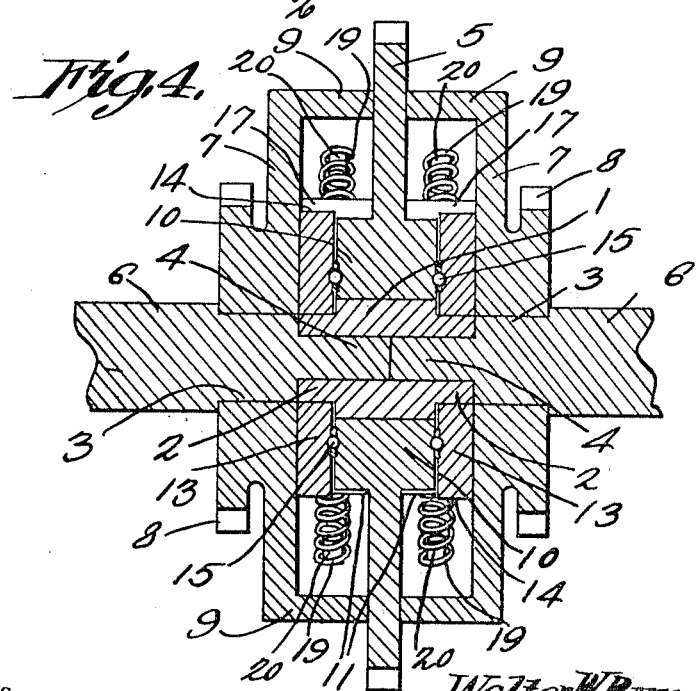

UNITED STATES PATENT OFFICE.

WALTER WM. BUNYAN, OF DECKERVILLE, MICHIGAN.

DIFFERENTIAL-POWER-TRANSMISSION MECHANISM.

1,250,700. Specification of Letters Patent. Patented Dec. 18, 1917.

Application filed January 15, 1917. Serial No. 142,499.

*To all whom it may concern:*

Be it known that I, WALTER WM. BUNYAN, a citizen of the United States, residing at Deckerville, in the county of Sanilac and State of Michigan, have invented a new and useful Differential-Power-Transmission Mechanism, of which the following is a specification.

The present invention appertains to mechanisms for transmitting power, and is particularly an improvement over the differential power transmitting mechanism disclosed in the patent granted to W. Fleenor, April 4, 1916, No. 1,178,005.

It is the object of the present invention to improve the arrangement and assemblage of the component parts, whereby to enhance the utility and efficiency of the mechanism.

The present mechanism is adapted especially for use upon traction engines, automobiles, and other self-propelled vehicles, although it can be used for various other purposes when a differential power transmitting mechanism is necessary. There are two driven members connected to the two driving wheels, or the like, and a driving member between the driven members, in combination with novel means between the driving and driven members whereby the driven members are both rotated in one direction or the other by the driving member, but either driven member can rotate faster than the driving member, in order that when the movement or path of the vehicle is other than in a straight line, the traction or ground wheel toward the outer side will be permitted to travel faster than the wheel at the inner side of the curve.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the mechanism.

Fig. 2 is a sectional view of the mechanism taken on the line 2—2 of Fig. 3, portions being broken away.

Figs. 3 and 4 are diametrical sections taken on the lines 3—3 and 4—4 of Fig. 2, respectively.

Referring to the drawings, there is illustrated a sleeve 1 having the square or non-circular ends 2, and a driving element 5 in the form of a disk or wheel is rotatable upon the intermediate portion of said sleeve, said wheel being provided with peripheral teeth whereby it can be actuated through the medium of a gear, sprocket chain or the like. When the device is used in an automobile or the like, the driven elements may constitute a pair of alining axle sections or shafts 6 to which the ground wheels (not shown) are connected. The shafts are provided with square or non-circular portions 3 at their adjacent ends, and with reduced terminals 4 journaled for rotation in the sleeve 1. The driven elements proper are designated by the numeral 7, being in the form of disks or wheels of slightly smaller diameter than the wheel 5, the disks 7 having central non-circular apertures fitted snugly upon the portions 3 so that the disks 7 and shafts 6 rotate together at the opposite sides of the wheel 5. The power can be taken from the disks 7 by means other than the shafts 6, such as by means of gears 8 provided upon the outer sides of the disks 7. The disks 7 which are located at opposite sides of the wheel 5 are provided with peripheral annular flanges 9 projecting toward one another and toward the wheel 5 to inclose the parts between the disks 7 and wheel 5.

An operative connection between the driving and driven elements is provided, in order that the motion of the driving element may be imparted to the driven elements, and in order that either driven element may rotate faster than the driving element irrespective of the direction in which the driving element is rotated. The driving element or wheel 5 is provided on each side or face with a centrally arranged enlargement or extension 10, each of which has an annular series of peripheral projections 11, which provide the oppositely facing shoulders 12. A pair of cam plates 13 are disposed between the enlargements or bosses 10 and the disks 7, said cam plates being provided with central non-circular apertures snugly receiving the ends 2 of the sleeve 1, whereby the sleeve connects said cam plates to cause them to rotate in unison, and to prevent relative movement therebetween. The cam plates 13 are provided with peripheral cams 14, there being one cam for each projection 11, and said cams being adapted to cover the shoulders 12, as seen in Fig. 2. The cam plates rest frictionally against the adjacent sides of the disks 7, and anti-frictional bearings 15 are provided between said cam plates and the bosses 10, whereby the cam plates tend to rotate with the driven disks 7, rather than with the driving element or wheel 5. The cams 14 overlap the extensions 11 and the cam plates together with the sleeve 1 are adapted to oscillate relative to the other parts.

A set of pawls or dogs 17 is carried by the inner face of each disk 7, some of the pawls projecting in one direction and the others in the opposite direction. The pawls being independent of one another, and being mounted upon pins or pintles 18 carried by the disks 7. The pawls are of a width to overlie both the bosses 10 and cam plates 13, as seen in Figs. 3 and 4. The free ends of the pawls bearing against the peripheries of the bosses and cam plates under the influence of coiled wire expansion springs 19 confined between the backs of the pawls and the flanges 9, the pawls and flanges having lugs 20 or other means engaging the ends of the springs for holding them in place.

The parts can be held assembled in any suitable manner, and can also be inclosed within a suitable casing. Thus, by preventing the separation of the shafts 6, this will hold the parts assembled without other means for that purpose.

The operation of the present mechanism is as follows:—Let it be supposed that the driving element or wheel 5 is actuated to rotate counter clockwise as seen in Fig. 2, or in the direction of the arrow, then the shoulders 12 which face in the direction of rotation will engage the ends of those pawls 17 which project in the opposite direction, as seen in Fig. 2, causing the disks or driven elements 7 to rotate with the wheel 5, the cam plates being turned with the disks 7 by frictional contact therewith to the position illustrated in Fig. 2. Either disk 7 can rotate faster than the wheel 5, since the cams 14 will guide the pawls past the shoulders 12 which face clock-wise relative to the device as seen in Fig. 2, thus preventing the pawls from catching said shoulders, and therefore enabling either disk 7 to rotate faster than the wheel as above stated. Both disks 7 are rotated at least as fast as the wheel 5, although either disk can rotate faster, as when rounding a curve, if the device is used on an automobile.

The operation of the device is the same when the driving element is rotated in either direction, since when the driving element is rotated clock-wise, as seen in Fig. 2, the cam plates 13 will remain passive with the driven elements until the rotation of the driving element or wheel 5 results in the respective pawls 17 being engaged by the shoulders 12 which face clock-wise, either disk 7 being free to rotate faster than the wheel 5, the same as above described only in the opposite direction.

Having thus described the invention, what is claimed as new is:

1. In a transmission mechanism, a rotatable member, a driving element mounted for rotation thereon and having oppositely facing shoulders, a pair of driven elements at opposite sides of the driving element, pawls carried by the driven elements and extending in opposite directions for engagement with said shoulders, and cam plates fitted upon the first mentioned member to rotate therewith and adapted to deflect the pawls past said shoulders in one direction or the other.

2. In a transmission mechanism, a rotatable member having non-circular portions, a driving element rotatable upon said member between said portions and having opposite bosses provided with oppositely facing shoulders, a pair of rotatable driven elements at opposite sides of the driving element, oppositely extending pawls carried by the driven elements to engage said shoulders, and cam plates fitted upon said non-circular portions and having cams for deflecting the pawls past said shoulders in one direction or the other.

3. In a transmission mechanism, a rotatable sleeve, alined shafts having adjacent terminals journaled in said sleeve, a driving element rotatable upon said sleeve and having oppositely facing shoulders, driven elements fitted non-rotatably upon said shafts at opposite sides of the driving element, oppositely extending pawls carried by the driven elements and engageable with said shoulders, and cam plates fitted non-rotatably upon said sleeve between the driving and driven elements for deflecting the pawls past said shoulders in one direction or the other.

4. In a transmission mechanism, a sleeve having non-circular ends, a pair of alined shafts having non-circular portions adjacent to the ends of the sleeve and having terminal portions journaled in the sleeve, a driving wheel rotatable upon the sleeve between its non-circular portions, a pair of disks fitted upon the non-circular portions of the shafts at opposite sides of said wheel, said wheel having oppositely facing shoulders on its opposite sides, pawls carried by said disks and engageable with said shoulders, said pawls extending in opposite directions, and cam plates fitted upon the non-circular portions of the sleeve between the wheel and disks and adapted to deflect the pawls past the shoulders when the disks are moved in one direction or the other.

5. In a transmission mechanism, a pair of driven disks, a driving wheel therebetween having oppositely facing shoulders, pawls carried by said disks at the inner sides thereof for engaging said shoulders, and cams between said wheel and disks for deflecting the pawls past the shoulders when one disk rotates faster than the wheel in either direction, said disks having peripheral flanges extending toward the wheel to inclose the parts between the wheel and disks.

6. In a transmission mechanism, a pair of driven disks, a driving wheel therebetween having oppositely facing shoulders, pawls carried by said disks at the inner sides thereof for engaging said shoulders, cams between said wheel and disks for deflecting the pawls past the shoulders when one disk rotates faster than the wheel in either direction, said disks having peripheral flanges extending toward the wheel to inclose the parts between the wheel and disks, and springs between said flanges and pawls for moving the pawls into engagement with said shoulders.

In testimony that I claim the foregoing as my own, I have hereto affixed my signature in the presence of two witnesses.

WALTER WM. BUNYAN.

Witnesses:
 CARL BINKLE,
 F. H. GREENE.

Copies of this patent may be obtained for five cents each, by addressing the "Commissioner of Patents, Washington, D. C."